US011245601B2

(12) United States Patent
Wang

(10) Patent No.: US 11,245,601 B2
(45) Date of Patent: Feb. 8, 2022

(54) AUTOMATED INTEGRATED TEST SYSTEM AND METHOD THEREOF

(71) Applicants: Inventec (Pudong) Technology Corporation, Shanghai (CN); INVENTEC CORPORATION, Taipei (TW)

(72) Inventor: Lei Wang, Shanghai (CN)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 16 days.

(21) Appl. No.: 17/013,651

(22) Filed: Sep. 7, 2020

(65) Prior Publication Data

US 2021/0075706 A1  Mar. 11, 2021

(30) Foreign Application Priority Data

Sep. 9, 2019 (CN) .......................... 201910848189.2

(51) Int. Cl.
*G06F 15/173* (2006.01)
*H04L 12/26* (2006.01)
*H04L 29/06* (2006.01)
*G06K 19/06* (2006.01)
*G06K 7/14* (2006.01)
*G06F 11/22* (2006.01)

(52) U.S. Cl.
CPC ........ *H04L 43/065* (2013.01); *G06F 11/2273* (2013.01); *G06K 7/1417* (2013.01); *G06K 19/06037* (2013.01); *H04L 43/08* (2013.01); *H04L 43/50* (2013.01); *H04L 63/1433* (2013.01)

(58) Field of Classification Search
CPC ....... H04L 43/065; H04L 43/08; H04L 43/50; H04L 63/1433; G06K 7/1417; G06K 19/06037; G06F 11/2273
See application file for complete search history.

(56) References Cited

U.S. PATENT DOCUMENTS

| 3,903,403 A | * | 9/1975 | Ferguson | ................. G09B 9/00 |
| | | | | 703/18 |
| 4,455,614 A | * | 6/1984 | Martz | ..................... F01K 23/10 |
| | | | | 290/40 R |

(Continued)

FOREIGN PATENT DOCUMENTS

| CN | 112384924 A | * | 2/2021 | ....... G05B 19/41875 |
| CN | 109326030 B | * | 9/2021 | ............... H04N 7/18 |
| TW | I739486 B | * | 9/2021 | ............. G01R 19/25 |

*Primary Examiner* — Richard G Keehn

(57) ABSTRACT

The present disclosure discloses an automated integrated test system and method thereof. A virtual mobile device is generated by a host at the test end at an initial time, which executes a preset script file to call the basic functions and the control functions after detecting the abnormal signals of production equipments, so as to simulate the processing flow of abnormal signals and to remotely adjust the equipment parameters. Then, a log file is generated according to the execution result of the script file, and the corresponding report files are generated according to different time ranges in the log file for transmission or display, so as to achieve the technical effect of improving the convenience of system testing in the complex environment.

10 Claims, 5 Drawing Sheets

(56) References Cited

U.S. PATENT DOCUMENTS

| | | | |
|---|---|---|---|
| 2018/0039719 A1* | 2/2018 | Liu | G06T 19/00 |
| 2018/0129761 A1* | 5/2018 | Lee | B63H 25/42 |
| 2020/0280576 A1* | 9/2020 | Key | H04L 63/1433 |
| 2020/0327029 A1* | 10/2020 | Prakash | G06F 11/3452 |
| 2021/0075706 A1* | 3/2021 | Wang | G06K 19/06037 |
| 2021/0342800 A1* | 11/2021 | Tang | G06Q 30/0185 |

* cited by examiner

AUTOMATED INTEGRATED TEST SYSTEM AND METHOD THEREOF

CROSS REFERENCE TO RELATED APPLICATION

This application claims the benefits of priority to Chinese Patent Application No. CN 201910848189.2, entitled "Automated Integrated Test System and Method Thereof", filed with CNIPA on Sep. 9, 2019, the contents of which are incorporated herein by reference in its entirety.

BACKGROUND

Field of Disclosure

The present disclosure relates to a test system and method, in particular, to an automated integrated test system and method thereof.

Description of Related Arts

In recent years, with the popularization and vigorous development of system integration, various integration methods have sprung up. However, as the number and variety of devices increase, it is desired for the manufacturers to test conveniently.

Generally speaking, after the system is integrated, multiple tests are required to confirm that the functions are in line with expectations. The test method is usually to manually perform operations on each device and confirm whether the overall operation process is normal. When problems occur, it is reported to the programmer for correction and adjustment. However, this method requires a lot of manpower and material resources, such as it is needed to configure the corresponding hardware and software devices. Therefore, this method is not convenient for system testing. In addition, manual testing is easy to make mistakes due to its dullness.

In view of this, some manufacturers put forward the technical means of automated testing, which presets corresponding program instructions on the software system, such as self-inspection instructions, and replaces manual testing by executing program instructions. However, this method is difficult to apply in a complex test environment. For example, in an application environment such as integrated production equipment, mobile devices and websites, the program instructions used for testing on the software system can only perform the tests independently. The overall situation can not be reflected. Therefore, system testing is still not convenient in a complex environment.

In summary, it can be known that system testing is not convenient for a long time, so it is necessary to propose an improved technical means to solve this problem.

SUMMARY

The present disclosure discloses an automated integrated test system and method thereof.

First, the present disclosure discloses an automated integrated test system, including a production equipment and a host at the test end. The production equipment executes a production system, which allows the host at the test end to perform remote control, so as to adjust the equipment parameters of the production equipment, and to generate abnormal signals, The host at the test end is connected to the production equipment through a network. The host at the test end includes a first test control module, a second test control module, an execution module, and a generating module. The first test control module executes a mobile device simulation program to generate a virtual mobile device at an initial time. The mobile device simulation program contains a plurality of basic functions for simulating the touch operation of the user in the virtual mobile device and simulating the operation result of the virtual mobile device performing the touch operation. The second test control module contains a plurality of control functions, including controlling a browser to log in to the maintenance webpage system and locating webpage elements in the browser through an application programming interface (API), and driving the browser to perform webpage operations according to the located webpage elements. The execution module is connected to the first test control module and the second test control module, and executes a preset script file to call the basic functions and the control functions after detecting the abnormal signal, so as to simulate the processing flow of abnormal signals and to remotely adjust the equipment parameters; the generating module is connected to the execution module for continuously recording the execution result of the script file so as to generate a log file, and generating corresponding report files for transmission or display according to different time ranges in the log file.

In addition, the present disclosure discloses an automated integrated test method for a network environment having a production equipment and a host at the test end, the method includes: executing a production system in the production equipment, the production system allows the host at the test end to perform remote control to adjust the equipment parameters of the production equipment, and allows the generation of abnormal signals; executing, via the host at the test end, a mobile device simulation program to generate a virtual mobile device at an initial time. The mobile device simulation program includes a plurality of basic functions for simulating the touch operation of the user in the virtual mobile device and simulating the operation result of the virtual mobile device performing the touch operation; executing via the host at the test end, a preset script file to call the basic functions and the control functions after detecting the generation of the abnormal signal, so as to simulate the processing flow of abnormal signals and to remotely adjust the equipment parameters. Wherein, executing control functions includes controlling a browser to log in to the maintenance webpage system and locating webpage elements in the browser through an application programming interface (API), and driving the browser to perform webpage operations according to the located webpage elements; and continuously recording, via the host at the test end, the execution result of the script file to generate a log file, and generating corresponding report files for transmission or display according to different time ranges in the log file.

The system and method disclosed by the present disclosure are described above. The present disclosure generates a virtual mobile device by the host at the test end at the initial time. The host at the test end executes a preset script file to call the basic functions and the control functions after detecting the abnormal signals of production equipments, so as to simulate the processing flow of abnormal signals and to remotely adjust the equipment parameters. Then, a log file is generated according to the execution result of the script file, and the corresponding report files are generated according to different time ranges in the log file for transmission or display.

Through the above technical means, the present disclosure can achieve the technical effect of improving the convenience of system testing in a complex environment.

DESCRIPTION OF REFERENCE NUMERALS

Figure 1:
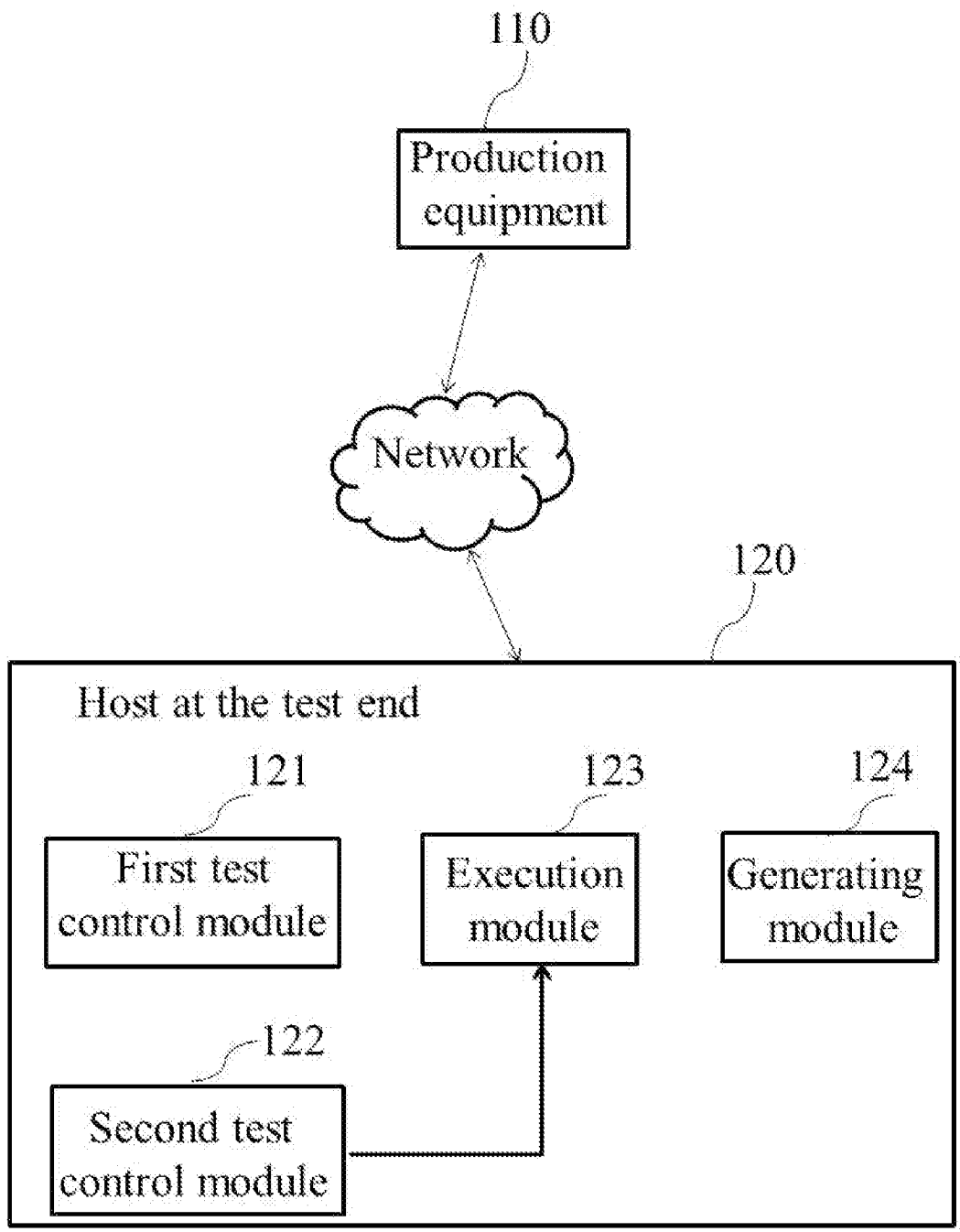
FIG. 1 is the schematic block diagram of an automated integrated test system according to the present disclosure.

110 Production equipment
120 Host at the test end
121 First test control module
122 Second test control module
123 Execution module
124 Generating module
300 Virtual mobile device
311 Return button
312 Spare-part-request button
313 Select-the-spare-part-recipient button
321 Selecting component
322 Selected-list button
323 Request button
400 Maintenance webpage system
410 Agree button STEP210 The production equipment executes a production system, the production system allows the host at the test end to perform remote control, so as to adjust at least one of the equipment parameters of the production equipment, and allows the generation of abnormal signals;

STEP220 The host at the test end generates a virtual mobile device by executing a mobile device simulation program at an initial time. The mobile device simulation program provides a plurality of basic functions for simulating the touch operations of the user in the virtual mobile device and simulating the operation result of the virtual mobile device performing the touch operation;

STEP230 The host at the test end executes a preset script file to call the basic functions and a plurality of control functions after detecting the generation of the abnormal signal, so as to simulate the processing flow of the abnormal signals and remotely adjust the equipment parameters. Executing the control functions includes controlling a browser to log in to a maintenance webpage system and locating at least one webpage element in the browser through an application programming interface, and driving the browser to perform webpage operations according to the located webpage element;

STEP240 The host at the test end continuously records the execution result of the script file to generate a log file, and generates corresponding report files for transmission or display according to different time ranges in the log file.

DETAILED DESCRIPTION OF THE PREFERRED EMBODIMENTS

The embodiments of the present disclosure will be described in detail below with reference to the drawings and embodiments, so that the implementation process of how the present disclosure applies technical means to solve technical problems and achieve technical effects can be fully understood and implemented accordingly.

Before describing the automated integrated test system and the method thereof disclosed in the present disclosure, the network environment to which the present disclosure is applied is described. The network environment includes a wired network or a wireless network or a combination of the two, so that the production equipment and the host at the test end can communicate with each other. The wired network can be connected by telephone wire, twisted pair, cable, optical fiber, or the like; The wireless network can be implemented by a wireless communication technology such as Bluetooth, W-Fi, LoRa, ZigBee, Constrained Application Protocol (CoAP) or Message Queuing Telemetry Transport (MQTT). In practical implementation, both the production equipment and the host at the test end can be implemented by using a computer device, such as a personal computer, a notebook computer, a tablet computer, a smart mobile device, a server, and the like.

The automated integrated test system and method thereof of the present disclosure are further explained by drawings as follows. Referring to FIG. 1, FIG. 1 is the schematic block diagram of the automated integrated test system according to the present disclosure. The system includes a production equipment 110 and a host at a test end 120. The production equipment 110 executes a production system. The production system allows the host at the test end 120 performs remote control to adjust the equipment parameters of the production equipment 110, and allows the generation of abnormal signals; In an exemplary embodiment, the abnormal signals are generated by pressing a function button at the production equipment 110, or when the production system detects an abnormal equipment parameter.

The host at the test end 120 is connected to the production equipment 110 through a network. The host at the test end 120 includes a first test control module 121, a second test control module 122, an execution module 123, and a generating module 124. The first test control module 121 executes a mobile device simulation program to generate a virtual mobile device at an initial time. The mobile device simulation program provides a plurality of basic functions for simulating the touch operation of the user in the virtual mobile device and simulating the operation result of the virtual mobile device performing the touch operation. In practice, the mobile device simulation program can be implemented by using MuMu simulator, Android simulator, or other similar simulators, so as to produce virtual mobile devices that simulate mobile phones or personal digital assistant (PDA). The virtual mobile devices can be automatically controlled by performing basic functions. For example, the basic function [mouseClick(x, y)] can be used to simulate a touch operation on a virtual mobile device (also called a cursor click), where "x" represents the X coordinate value of the selected position and "y" represents the Y coordinate value of the selected position; The display state of the virtual mobile device can be detected by the basic function [scanDisplays]; The basic function [ocrText( )] can be used to recognize text information displayed by the virtual mobile device, and so on. In addition, the basic functions may further include simulating a network attack for security testing, simulating a load for performance testing, and simulating heavy network traffic and user operations for stress testing and the like. In particular, the mobile device simulation program may also establish a virtual imaging component in the generated virtual mobile device. The virtual imaging component may perform image analysis on the two-dimensional barcode displayed in the virtual mobile device, to obtain the information embedded in the two-dimensional barcode. In other words, this method can simulate scanning the two-dimensional barcode to obtain the same result as scanning the two-dimensional barcode using a physical imaging component. In addition, the virtual imaging component may also allow the control of the executed script file, to generate the 2D barcode required for the test process. The test process therefore is proceeded as expected. For example: when a sequence number (e.g., "SMTLINE01-AO1-001") needs to be entered at a certain step in the automated test process, the virtual imaging component is controlled by the executed script file to produce a 2D barcode embedded with the sequence number "SMTLINE01-AO1-001", so as to provide the test process with simulated scanned 2D barcode and obtain the sequence number, so that the test process can be executed as expected.

The second test control module 122 provides control functions. The control function includes controlling a browser to log in to the maintenance webpage system and locating webpage elements in the browser, and driving the browser to perform webpage operations according to the located webpage elements, through an application programming interface (API); In an exemplary embodiment, the control functions are a set of program instructions used to control the browser to perform corresponding actions. For example, controlling the browser to log in to the webpage, performing various operations on the webpage, and the like. The difference between the control functions and basic function is that the basic functions control the virtual mobile device, while the control functions control the browser.

The execution module 123 is connected to the first test control module 121 and the second test control module 122, and executes a preset script file to call the basic functions and the control functions after detecting the generation of the abnormal signal, so as to simulate the processing flow of abnormal signals and to remotely adjust the equipment parameters of production equipment 110. In an exemplary embodiment, the script file is written by a script language, which is a programming language for controlling the program, and is usually stored with "ASCII" characters. For example, the script file may include a series of basic functions and control functions to perform a series of operations on the virtual mobile device or browser, such as testing whether a preset text will appear after the virtual mobile device is clicked at a certain coordinate position. Then, the script file may include the basic functions [mouseClick(x, y)] and [ocrText( )] for sequentially simulating operations such as clicking the virtual mobile device and identifying the characters appeared. Supposing a browser is controlled to locate webpage elements, the script file may include a control function [webDrivergetElementByXPath( )] to locate webpage elements. In addition, before the host at the test end 120 executing the script file, all parameters of database data, configuration files, environment parameters, basic functions and control functions in host at the test end 120 will be initialized to ensure that the result of each execution is not affected by other factors.

The generating module 124 is connected to the execution module 123 for continuously recording the execution result of the script file, so as to generate a log file, and generate corresponding report files for transmission or display according to different time ranges (e.g. year, month, day, etc.) in the log file. In an exemplary embodiment, the log file records the information or events generated at each time point during the execution of the script file, such as a feedback of a success or error message. Then, the information or events at each time point are separated by year, month or day to form a report file in units of a whole year, whole month, single-season or one week, etc. In addition, in an exemplary embodiment, the report file may be embedded in at least one of the email, the instant message and the webpage file, and transmitted to the mobile device through the network for display.

In particular, the modules of the present disclosure may be implemented in various manners, including software, hardware, or any combination thereof. For example, in some embodiments, modules may be implemented using either software or hardware. In addition, the present disclosure may also be implemented partially or completely based on hardware. For example, one or more modules in the system may be implemented through an integrated circuit chip, a system on chip (SoC), a complex programmable logic device (CPLD), a field programmable gate array (FPGA), etc. The disclosure may be a system, method and/or computer program. The computer program may include a computer readable storage media containing computer readable program instructions for enabling the processor to realize various aspects of the present disclosure. The computer readable storage media may be a physical device that can maintain and store instructions used by the instruction execution device. The computer readable storage media may be, but is not limited to, an electrical storage device, a magnetic storage device, an optical storage device, an electromagnetic storage device, a semiconductor storage device, or any suitable combination of the above. More specific examples (non-exhaustive lists) of computer readable storage media include: hard disks, random access memories, read-only memories, flash memories, optical disks, floppy disks, and any suitable combination of the above. A computer readable storage medium as used herein is not to be interpreted as a transient signal itself, such as a radio wave or other freely propagating electromagnetic wave, an electromagnetic wave propagating through a waveguide or other transmission medium (eg, an optical signal through a fiber optic cable), or an electrical signal transmitted over a wire. Additionally, the computer readable program instructions described herein may be downloaded from a computer readable storage media to various computing/processing devices, or downloaded to an external computer device or an external storage device over a network, such as an internet, regional network, wide area network, and/or wireless network. The network may include copper transmission cables, fiber optic transmission, wireless transmission, routers, firewalls, exchanger, concentrators, and/or gateways. The network card or network interface in each computing/processing device receives computer readable program instructions from the network and forwards the computer readable program instructions for storage in a computer readable storage media in each computing/processing device. Computer program instructions for performing the operations of the present disclosure may be combined language instructions, instruction set architecture instructions, machine instructions, machine-related instructions, microinstructions, firmware instructions, or source code/object code written in one programming language or a combination of programming languages. The programming languages include object-oriented programming languages, such as Common Lisp, Python, C++, Objective-C, Smalltalk, Delphi, Java, Swift, C #, Perl, Ruby, PHP, etc., and conventional procedural programming languages, such as C language or similar programming languages. The computer readable program instructions may be executed entirely on a computer, partially on a computer, as independent software, partially on a client computer and partially on a remote computer, or entirely on a remote computer or server.

Figure 2:
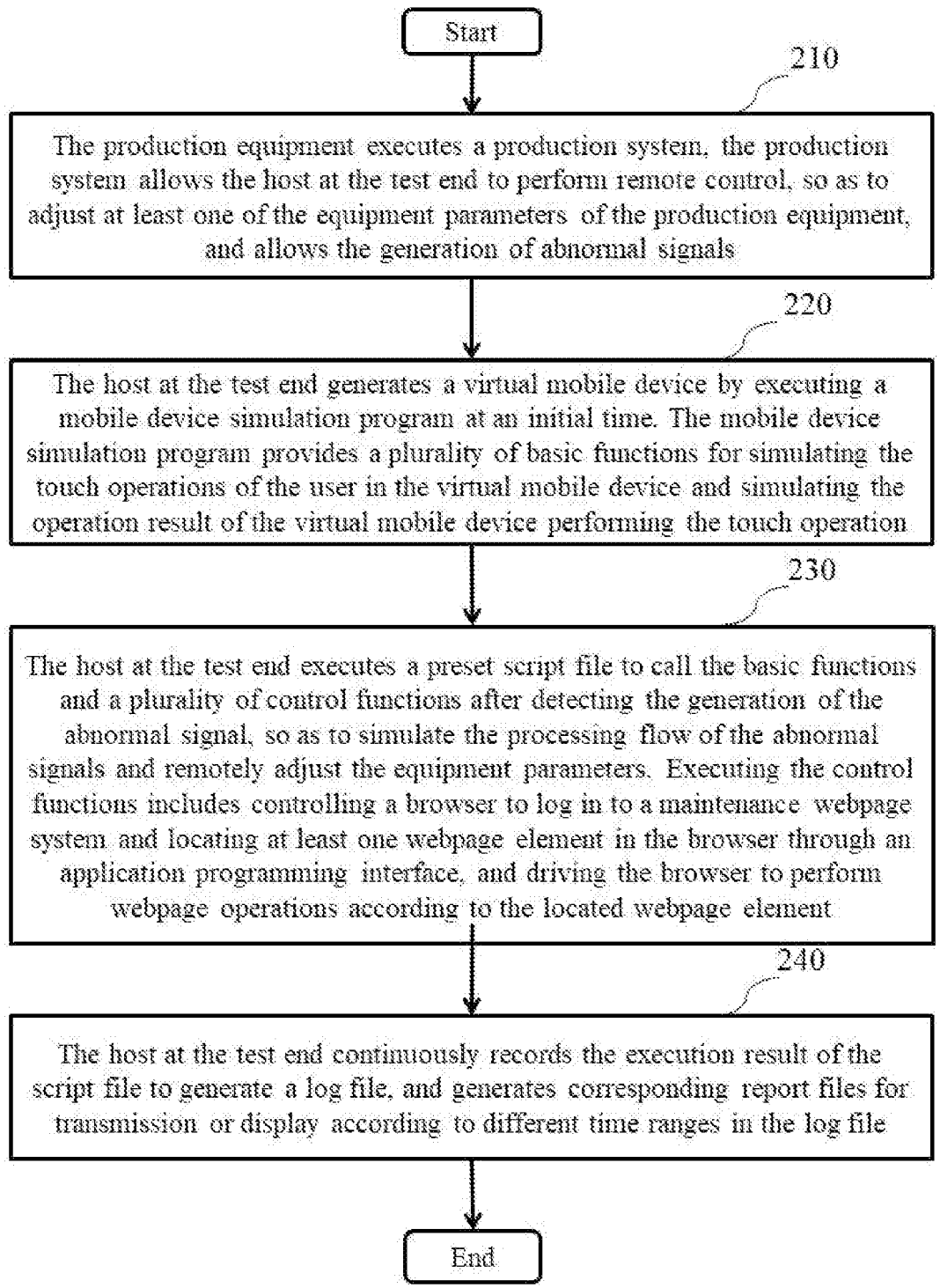
FIG. 2 is the flow chart of an automated integrated test method according to the present disclosure.

Next, referring to FIG. 2, FIG. 2 is the flow chart of an automated integrated test method of the present disclosure. The method is applied to a network environment having a production equipment 110 and a host at the test end 120. The method includes: executing a production system at the production equipment 110. The production equipment 110 allows the host at the test end 120 to perform remote control in order to adjust the equipment parameters of the production equipment 110, and allows the generation of abnormal signals (STEP210); the host at the test end 120 executes a mobile device simulation program to generate a virtual mobile device at an initial time. The mobile device simulation program provides a plurality of basic functions for simulating the touch operation of the user in the virtual mobile device and simulating the operation result of the virtual mobile device performing the touch operation (STEP220); The host at the test end 120 executes a preset script file to call the basic functions and the control functions after detecting the generation of the abnormal signal, so as to simulate the processing flow of abnormal signals and remotely adjust the equipment parameters. Executing control functions includes controlling a browser to log in to the maintenance webpage system and locating webpage elements in the browser, and driving the browser to perform webpage operations according to the located webpage elements, through an application programming interface (API) (STEP230); The host at the test end 120 continuously records the execution result of the script file to generate a log file, and generates corresponding report files for transmission or display according to different time ranges in the log file (STEP240). Through the above steps, a virtual mobile device can be generated by the host at the test end 120 at an initial time. The host at the test end 120 executes a preset script file to call the basic functions and the control functions after detecting the abnormal signals generated by production equipment 110, so as to simulate the processing flow of abnormal signals and to remotely adjust the equipment parameters of production equipment 110. Then, a log file is generated according to the execution result of the script file, and the corresponding report files are generated according to different time ranges in the log file for transmission or display.

Figure 3A:
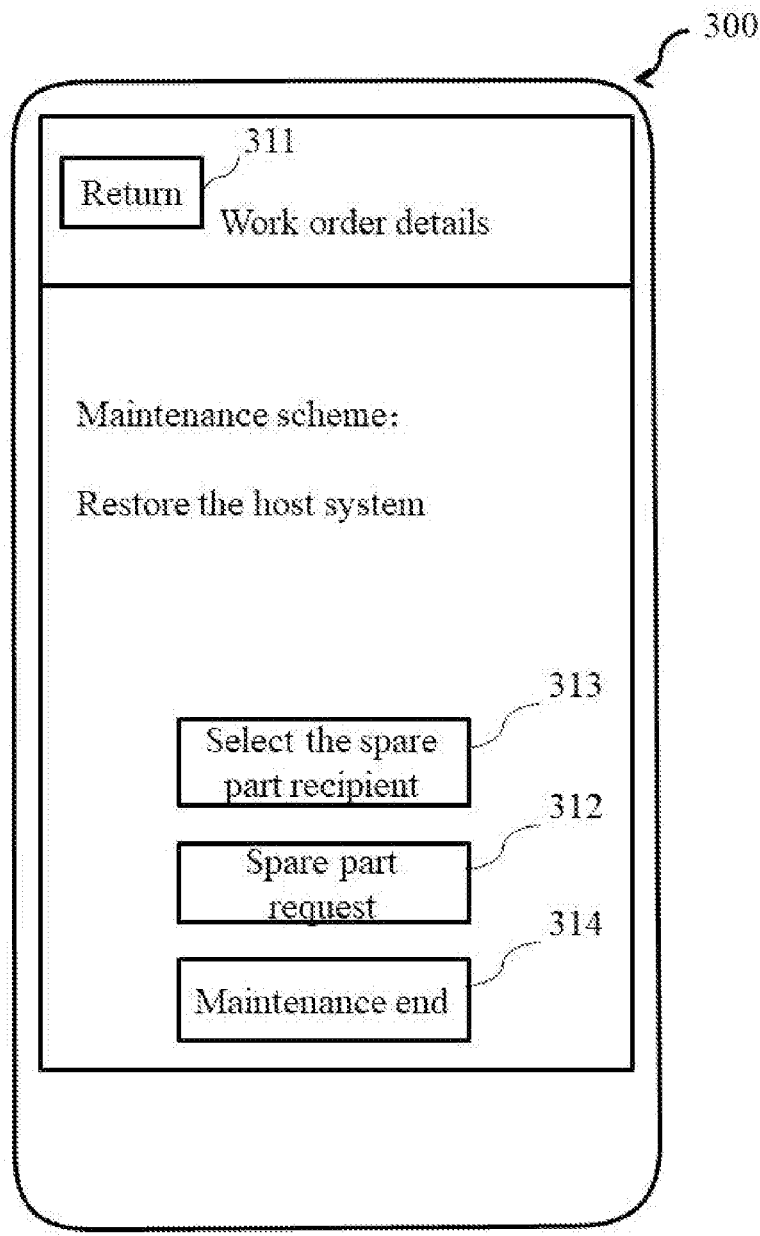
FIG. 3A and FIG. 3B are schematic diagrams of applying the present disclosure for testing in a complex environment.

The following description will be made according to embodiments with reference to FIG. 3A to FIG. 4. Please referring to FIG. 3A and FIG. 3B first, which are schematic diagrams of applying the present disclosure for testing in a complex environment. It is assumed to test the process when production equipment fails in a complex environment, which includes a production equipment, an Andon system, a maintenance web system and a mobile device. The tester may generate an abnormal signal by pressing a physical button of the production equipment 110 to simulate the failure of production equipment 110. Then, when detecting the abnormal signal, the host at the test end 120 treats the abnormal signal as an alarm of the Andon system, and executes a script file to call the preset basic functions and the control functions to simulate the various steps in the processing flow, such as process like sequentially simulating a malfunction, requesting for repair, auditing, repairing, and reporting. In the repairing process, the host at the test end 120 can remotely adjust the equipment parameters of production equipment 110, so as to simulate the actual maintenance of the maintenance personnel. Specifically, the host at the test end 120 initially executes a mobile device simulation program to generate a virtual mobile device 300 as illustrated in FIG. 3A. The mobile device simulation program provides a plurality of basic functions to simulate the operational behavior of the maintenance personnel. In this way, the same operational effect can be achieved through simulation without using physical mobile devices. In an exemplary embodiment, by using different basic functions and their parameters, the corresponding buttons in the virtual mobile device 300 may be automatically selected. For example, the return button 311, the spare-part-request button 312, the select-the-spare-part-recipient button 313, and the maintenance-end button 314 are used to simulate various operation behaviors of the maintenance personnel on the physical mobile device. For example, if the coordinate position of the return button 311 is (10, 15), the base function "mouseClick(10, 15)" can be used to simulate the operation of the maintenance personnel touching and clicking the return button 311.

Figure 3B:
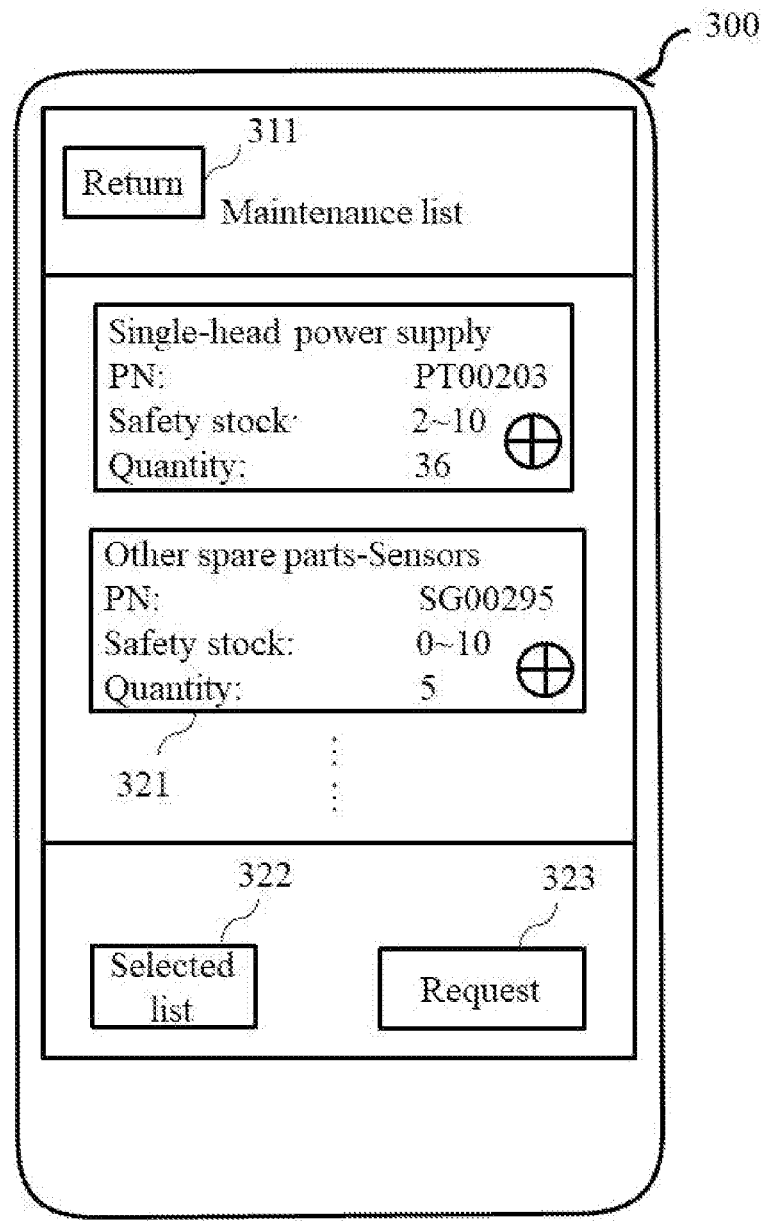

Next, taking "requesting for repair" as an example, after the basic function is executed to simulate the operation behavior of the maintenance personnel clicking the spare-part-request button 312, the virtual mobile device 300 will display the maintenance list and all available parts, as shown in FIG. 3B. Similar to clicking the button by the basic functions, different parameters are brought in, so that the basic function clicks a specified selecting component (for example, selecting component 321) to add the part to be requested into the selected list. In fact, assuming that multiple parts have been selected, the selected-list button 322 may be clicked to confirm the selected part. However, in the simulation process, this step may be omitted to directly simulate clicking the request button 323 to apply for the selected parts.

Figure 4:
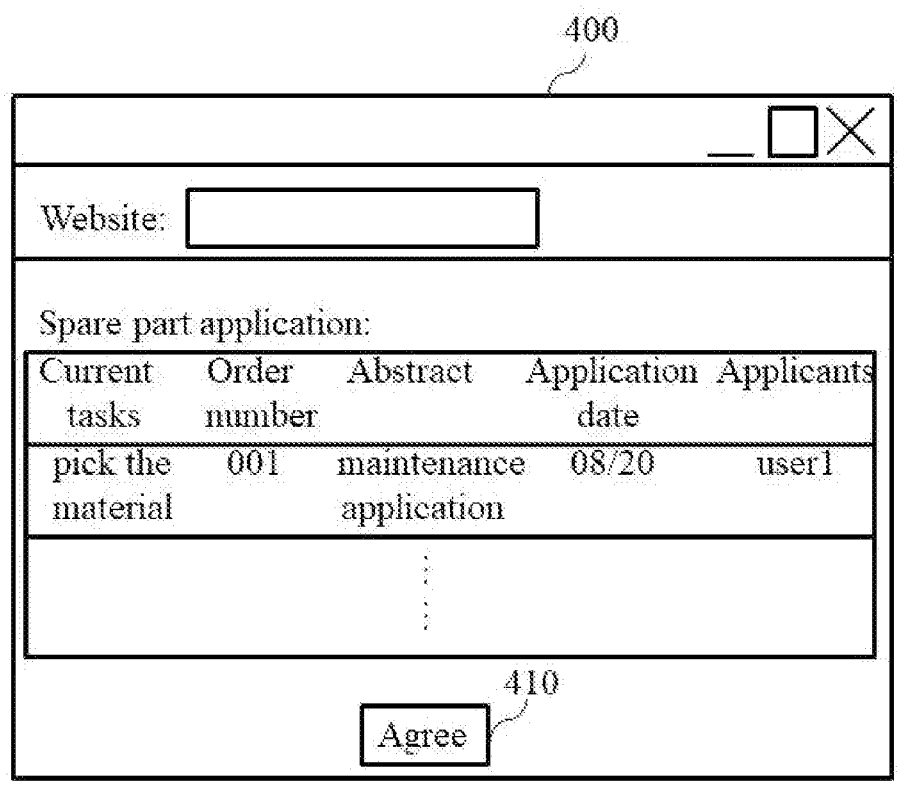
FIG. 4 is a schematic diagram of simulating the operation in the maintenance webpage system by applying the present disclosure.

FIG. 4 is a schematic diagram of simulating the operation in the maintenance webpage system by applying the present disclosure. When the request is simulated by the virtual mobile device 300, the maintenance web system 400 will also have a corresponding record. At this time, in order to simulate the verifying process, the host at the test end 120 will control the browser to connect to the maintenance webpage system 400 and locating webpage elements in the browser (for example, agree button 410 in the webpage) through an API (e.g., "WebDriver API" and "Selenium API"), and drive the browser to perform webpage operations according to the located webpage elements. For example, the agree button 410 may be firstly located by a control function "webDrivergetElementByXPath( )". Then, the located agree button 410 may be clicked by a control function "webDrivertryClickElement( )", so that the operation of administrator approving the request in the maintenance web system 400 can be simulated automatically. Finally, the host at the test end 120 continuously records the execution result of the script file to generate a log file, and generates corresponding report files for transmission or display according to different time ranges in the log file, for example, generates report files monthly, quarterly, or weekly.

In summary, it can be known that the difference between the present disclosure and the existing technology is that the present disclosure generates a virtual mobile device by the host at the test end at the initial time. The host at the test end executes a preset script file to call the basic functions and the control functions after detecting the abnormal signals of production equipments, so as to simulate the processing flow of abnormal signals and to remotely adjust the equipment parameters. Then, a log file is generated according to the execution result of the script file, and the corresponding report files are generated according to different time ranges in the log file for transmission or display. The abovementioned technological means can solve the problems existing in the existing technology and achieve the technical effect of improving the convenience of system testing in the complex environment.

Although the present disclosure is disclosed above in the foregoing embodiments, it is not intended to limit the disclosure. Any person skilled in the art can make modifications and retouching without departing from the spirit and scope of the present invention. Therefore, the scope of patent protection of the present disclosure shall be subject to the definition of the claim attached to this specification.

What is claimed is:

1. An automated integrated test system, comprising:
a production equipment, which is used to execute a production system, the production system allows remote control of a host at the test end to adjust at least one equipment parameter of the production equipment and to allow the generation of abnormal signals; and
the host at the test end is configured to be connected to the production equipment through a network, and the host at the test end comprises:
a first test control module, which is configured to execute a mobile device simulation program to generate a virtual mobile device at an initial time, wherein the mobile device simulation program provides a plurality of basic functions for simulating touch operations of a user in the virtual mobile device and simulating an operation result of the virtual mobile device performing the touch operations;
a second test control module, which is configured to provide a plurality of control functions, the control functions comprise controlling a browser to log in to a maintenance webpage system and locating at least one webpage element in the browser through an application programming interface, and driving the browser to perform webpage operations according to the located webpage element;
an execution module, which is connected to the first test control module and the second test control module, and is configured to execute a preset script file to call the basic functions and the control functions after detecting the generation of the abnormal signals, so as to simulate a processing flow of the abnormal signals and to remotely adjust the equipment parameters; and
a generating module, which is connected to the execution module for continuously recording an execution result of the script file to generate a log file, and generating corresponding report files for transmission or display according to different time ranges in the log file.

2. The automated integrated test system according to claim 1, wherein the abnormal signals are generated by pressing a function button at the production equipment, or when the production system detects the abnormal equipment parameter.

3. The automated integrated test system according to claim 1, wherein the mobile device simulation program establishes a virtual imaging component in the generated virtual mobile device, the virtual imaging component allows the control of the script file, so as to generate a two-dimensional barcode containing a sequence number, and control the virtual imaging component to simulate scanning the two-dimensional barcode to obtain the sequence number.

4. The automated integrated test system according to claim 1, wherein the basic functions further comprise simulating a network attack for security testing, simulating a load for performance testing, and simulating heavy network traffic and user operations for stress testing.

5. The automated integrated test system according to claim 1, wherein the generating module embeds the report file in at least one of an email, an instant message and a webpage file, and transmits the report file to a mobile device through a network for display.

6. An automated integrated test method, applied to a network environment having a production equipment and a host at the test end, the method comprises:
executing a production system in the production equipment, the production system allows the host at the test end to perform remote control to adjust at least one equipment parameter of the production equipment, and allows the generation of abnormal signals;
executing, via the host at the test end, a mobile device simulation program to generate a virtual mobile device at an initial time, wherein the mobile device simulation program provides a plurality of basic functions for simulating touch operations of a user in the virtual mobile device and simulating an operation result of the virtual mobile device performing the touch operations;
executing, via the host at the test end, a preset script file to call the basic functions and a plurality of control functions after detecting the generation of the abnormal signals, so as to simulate a processing flow of the abnormal signals and to remotely adjust the equipment parameters, wherein, executing the control functions comprises controlling a browser to log in to a maintenance webpage system and locating at least one of the webpage elements in the browser through an application programming interface, and driving the browser to perform webpage operations according to the located webpage elements; and
continuously recording, via the host at the test end, an execution result of the script file to generate a log file, and generating corresponding report files for transmission or display according to different time ranges in the log file.

7. The automated integrated test system according to claim 6, wherein the abnormal signals are generated by pressing a function button at the production equipment, or when the production system detects the abnormal equipment parameter.

8. The automated integrated test method according to claim 6, wherein the mobile device simulation program establishes a virtual imaging component in the generated virtual mobile device, the virtual imaging component allows a control of the script file, so as to generate a two-dimensional barcode containing a sequence number, and control the virtual imaging component to simulate scanning the two-dimensional barcode to obtain the sequence number.

9. The automated integrated test method according to claim 6, wherein the basic functions further comprise simulating a network attack for security testing, simulating a load for performance testing, and simulating heavy network traffic and user operations for stress testing.

10. The automated integrated test method according to claim 6, wherein the report file is embedded in at least one of an email, an instant message and a webpage file, and transmitted to a mobile device through a network for display.

* * * * *